United States Patent
Ding

(10) Patent No.: US 6,226,380 B1
(45) Date of Patent: May 1, 2001

(54) METHOD OF DISTINGUISHING BETWEEN ECHO PATH CHANGE AND DOUBLE TALK CONDITIONS IN AN ECHO CANCELLER

(75) Inventor: Heping Ding, Kanata (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/026,434

(22) Filed: Feb. 19, 1998

(51) Int. Cl.[7] ........................................... H04M 9/08
(52) U.S. Cl. ................................. 379/410; 455/570
(58) Field of Search ............................. 379/406–411; 455/569, 570

(56) References Cited

U.S. PATENT DOCUMENTS 6,035,034 * 3/2000 Trump .................................. 379/410

* cited by examiner

Primary Examiner—Wing F. Chan

(74) Attorney, Agent, or Firm—Jeff Measures

(57) ABSTRACT

The invention provides an adaptive echo canceller and method for detecting double talk (DT) and echo path change (EPC) conditions and for distinguishing therebetween. DT and EPC conditions are detected by comparing a generated echo return loss enhancement (ERLE) signal with a selected ERLE threshold level. Similarly, the energy level of the echo canceller incoming signal is compared with a second threshold level. If the level of the ERLE signal is below its threshold and the level of the incoming signal is above the second threshold, a DT or EPC condition is deemed to exist and a predetermined signal is generated. Responsive to this signal, an orthogonality monitor recognizes the predetermined signal as representing either a DT or EPC condition. The determination is obtained by comparing the absolute value of cross-correlation between the output signal to be transmitted from the echo canceller and the echo estimate signal generated by the adaptive filter of the echo canceller to the product of a predetermined EPC threshold level and an average amplitude estimate of the product of the output signal to be transmitted from the echo canceller and the echo estimate signal generated by the adaptive filter of the echo canceller.

11 Claims, 4 Drawing Sheets

METHOD OF DISTINGUISHING BETWEEN ECHO PATH CHANGE AND DOUBLE TALK CONDITIONS IN AN ECHO CANCELLER

BACKGROUND OF THE INVENTION

1. Field of the Invention

This invention relates generally to an echo canceller for use at a telecommunications network node and more particularly to an adaptive echo canceller for reliably detecting double talk conditions and echo path changes and distinguishing therebetween.

2. Description of Background and Related Art

The presence of echoes in long-distance telephony is a thorny problem. A long-distance communication circuit usually comprises four-wire and two-wire segments joined at each end of the transmission line by hybrid circuits. Impedance mismatch in a hybrid circuit causes a portion of the signal received at the hybrid circuit to be reflected back onto the transmit four-wire segment whence it came and this reflected signal is perceived as echo to the speaker who originated it. Adaptive echo cancellers are thus employed to minimize the impact of echo signals created on four-wire transmission lines.

Normally, a four-wire receive signal is at a higher level than its echo signal on the four-wire transmit path because there is loss across the hybrid circuit. Near-end speech on the transmit path will therefore typically be stronger than the echo signal. However, near-end speech is unwanted noise as far as convergence of the echo canceller is concerned since it would diverge the canceller if the latter was to continue updating its estimated impulse response while near-end speech is present. Various techniques and schemes have therefore been developed to provide double talk detection and thus alleviate the problem.

The problem of echo cancellation on the telephone network is exacerbated by the connection of a handsfree terminal at one or both ends of the transmission line. Double talk detection in a handsfree system refers to the determination of whether, in the microphone output, there is near-end speech mixed with probably much stronger far-end signal played through the loudspeaker. By comparison with double talk detection for network echo cancellation applications, double talk detection in an acoustic echo cancellation handsfree system is more likely to be subjected to sudden echo path changes as well as to echo levels that are much above the level of near-end speech. This is due to the fact that, in a handsfree terminal, the receive transducer or speaker is close to the microphone of the terminal than the near-end user; furthermore, the case of the terminal conducts a substantial amount of acoustic energy from its speaker to its microphone. In a typical implementation, it is not unusual for the far-end signal from the loudspeaker to be as large as 25 db (decibel) above the level of the near-end signal at the microphone. The near-end speech signal by a user of the terminal is therefore difficult to ascertain because the far-end signal from the loudspeaker will mask at least a portion of the signal generated by the near-end user.

Numerous schemes of double talk detection have been devised and usually fall into one of three categories. A first category which may be labelled the energy comparison scheme usually employs power detectors for detecting the average power, the peak power and the residual power of various signals to generate the output signal of a double talk detector. Energy comparison is the most straight forward and the simplest of the three categories; however, it does not reliably detect double talk situations because an echo path change can cause energy fluctuation patterns similar to that caused by a real double talk condition. Basically, an energy comparison scheme is not able to distinguish between an echo path change and a double talk condition. Example circuits of this type of double talk detectors are described in U.S. Pat. Nos. 4,360,712, 5,463,618 and 4,645,883.

A second category which may be labelled a cross-correlation technique is basically an extension of the energy comparison category; it adds a cross-correlation criterion between various signals to arrive at a control decision. This scheme is more complicated than the energy comparison technique and requires additional memories and computational power. While providing increased performance over the energy comparison scheme, this method is also not deemed to provide an adequately reliable detection scheme. Examples of this type of double talk detection may be found in U.S. Pat. Nos. 5,646,990 and 5,193,112.

Yet a third category is related to the cross-correlation technique; it requires the monitoring of the directions of the updating vectors for the echo canceller which are given by an adaptation algorithm such as NLMS (Normalized Least Mean Square). If the updating vectors over a number of samples all roughly point at a common direction, the echo canceller is in the converging mode. If on the other hand, the vectors point at various diverse directions, the echo canceller is deemed to have converged. This decision process together with the energy of the signals are then used to determine whether a double talk condition exits. Under most conditions, this scheme may provide a fairly reliable result but is very computation intensive. Double talk detection implementations based on the monitoring of updating vectors may be found in U.S. Pat. No. 4,918,727.

As discussed below, the detection of double talk conditions and echo path changes is important to the proper operation of an echo cancellation system. Furthermore, it is critically important to reliably detect and distinguish between double talk and echo path changes. However, the known energy comparison methods and the cross-correlation methods are both deemed to suffer from inadequate performance. The vector monitoring and updating method, on the other hand, may provide a relatively reliable output but its high demands on computational capability renders it unsuitable for use in most low cost commercial digital signal processors (DSP) utilized in high volume products such as consumer telecommunications terminals.

SUMMARY OF THE INVENTION

It is therefore an object of the invention to provide an enhanced adaptive echo canceller for reliably detecting double talk conditions and echo path changes and for distinguishing therebetween.

It is a further object of the invention to provide an enhanced echo canceller that is simple and thus economical to implement.

It is a still further object of the invention to provide an enhanced echo canceller that may be used effectively in both acoustic and network echo canceller systems.

From a first aspect of the invention, there is provided a method for detecting double talk (DT) and echo path change (EPC) conditions and for distinguishing therebetween. DT and EPC conditions are detected by comparing a generated echo return loss enhancement (ERLE) signal with a selected ERLE threshold level. Similarly, the energy level of the echo canceller incoming signal is compared with a second threshold level. If the level of the ERLE signal is below its threshold and the level of the incoming signal is above the second threshold, a DT or EPC condition is deemed to exist and a predetermined signal is generated. Responsive to this signal, an orthogonality monitor recognizes the predetermined signal as representing either a DT or EPC condition. The determination is obtained by comparing the absolute value of cross-correlation between the output signal to be transmitted from the echo canceller and the echo estimate signal generated by the adaptive filter of the echo canceller to the product of a predetermined EPC threshold level and an average amplitude estimate of the product of the output signal to be transmitted and the echo estimate signal generated by the adaptive filter of the echo canceller.

From a second aspect of the invention, there is provided an echo canceller for detecting echo path change and double talk conditions and for distinguishing therebetween, comprising, an adaptive filter for being communicatively coupled between a receive path and a transmit path at a network node of a communication system and for generating an echo estimate signal from a reference signal received at the echo canceller, means for generating an echo return loss enhancement (ERLE) signal from signals at the echo canceller and comparing it to a first threshold level, means for generating a signal corresponding to the energy level of a signal x(n) which is the incoming reference signal for the echo canceller and comparing it to a second threshold level, and means for generating a predetermined signal to an orthogonality monitor if the energy level of the ERLE signal is below the first threshold level and the energy level of the x(n) signal is above the second threshold level, the predetermined signal indicating that a DT or EPC condition has been detected. The orthogonality monitor comprises means for generating an EPC acknowledgement signal if the absolute value of cross-correlation between the output signal to be transmitted from the echo canceller and the echo estimate signal generated by the adaptive filter of the echo canceller is greater than the product of a predetermined EPC threshold level and an average amplitude estimate of the product of the output signal to be transmitted and the echo estimate signal generated by the adaptive filter of the echo canceller.

DETAILED DESCRIPTION OF THE DRAWINGS

Figure 1:
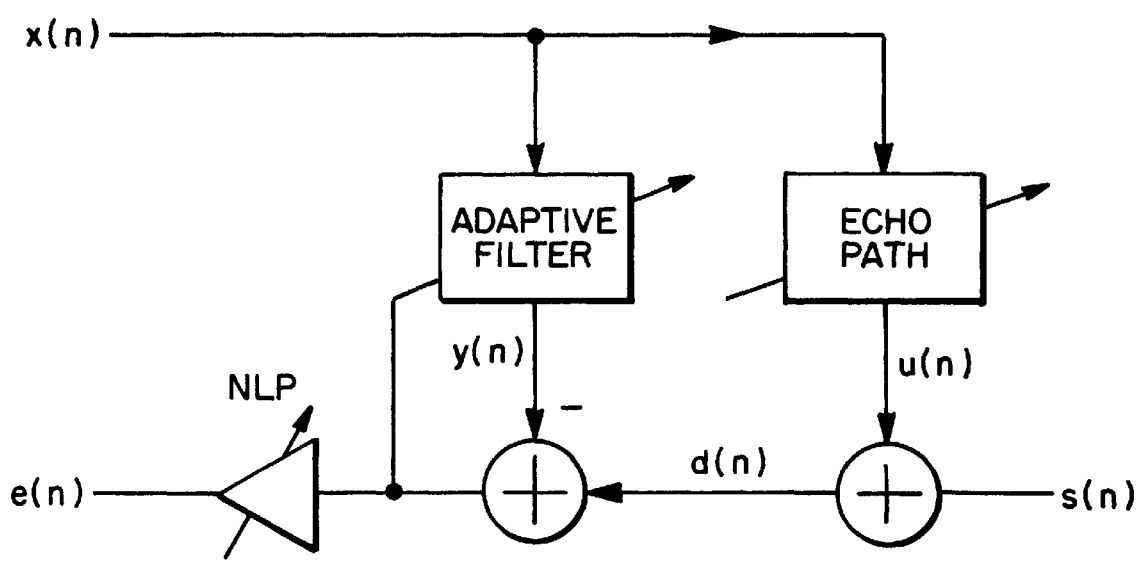
FIG. 1 is a block diagram of a generalized adaptive echo canceller circuit.

FIG. 1 shows a simplified block diagram of an adaptive echo canceller wherein, x(n) is the far-end or reference signal for the echo canceller, s(n) is the generated near-end signal, u(n) is the echo of x(n) through the echo path, and d(n) is the perceived near-end signal which is the sum of a generated near-end signal s(n) and the echo signal u(n). The output signal e(n) is the signal d(n) less an echo estimate y(n) generated by the adaptive filter. Functionally, the adaptive filter is programmed to generate an output signal y(n) that is as close to u(n) as possible so that the latter is largely cancelled by the former and e(n) closely resembles the generated near-end signal s(n). The non-linear process (NLP) controls the amount of e(n) that is transmitted to the far end. When there is no s(n), NLP closes the gate so as to prevent any possible uncancelled echo from being transmitted to the far end. When a valid s(n) exists, NLP opens the gate so as to let the far end hear the signal. It should be realized that, as is usual in contemporary echo cancellation systems, the circuitry depicted in FIG. 1 is embodied in a suitably programmed digital signal processor (DSP).

It should be noted that, depending on the application of the echo canceller, the terms "far-end" and "near-end" may need to be interchanged, For example, in the application of a network echo canceller in a telephone terminal, x(n) is actually the near-end signal to be transmitted to the far end and d(n) is the signal received from the telephone loop connected to the far end. Although the terminology in this document is based on the assumption that x(n) is the far-end signal and d(n) is the signal perceived at the near end, such as the case with an acoustic echo cancellation system in a telephone terminal or a network echo cancellation system in a line card, it does not prevent the invention from being applied to applications requiring the alternate terminology.

Double talk detection (DTD) in an echo cancellation (EC) system refers to the determination of whether a signal d(n) comprises a signal s(n) mixed with a signal u(n), that is, whether there is signal activity in both directions of the transmission link. It may be noted that, without the presence of a signal x(n) and thus of a signal u(n), the problem of detecting the presence of a signal s(n) is somewhat trivial and will not be discussed further.

A double talk detector is commonly used to control the update of the adaptive filter's parameters in an echo canceller circuit. These parameters may need to be frozen, that is not updated, when a double talk situation exists or they may diverge. A capable double talk detection scheme is crucial to the robustness of an acoustic echo cancellation hansdsfree (AECHF) system; it allows the system to identify DT conditions and adjust the losses on the receive and transmit paths accordingly to achieve a subjectively full-duplex operation while still maintaining system stability under various circumstances such as severe echo path changes.

Echo path change detection (EPCD) in an echo cancellation system refers to the determination of whether the adaptive filter has converged so that e(n) best resembles s(n) for a given set of conditions. If there is an EPC after the adaptive filter has converged to the previous echo path characteristics, an EPCD scheme must consider the EC as not converged so that it is allowed to converge. As mentioned above, it is important to distinguish between a DT condition and an EPC so that the EC can update its parameters without running the risk of diverging.

Conditions that may affect the operation of the circuit of FIG. 1 may be summarized as follows:

If a detection scheme fails to detect a DT condition, the NLP gate will not be opened as needed so that the far end will not hear a valid s(n), i.e. the link becomes half-duplex, and the adaptive filter is not controlled to stop adapting and, if it continues adapting, may diverge as a result of the strong interference from signal s(n).

If a detection scheme falsely detects a DT condition when there is actually no DT or EPC, the NLP gate will be opened mistakenly, letting an unacceptably large echo be transmitted to the far end.

If a detection scheme fails to detect an EPC condition, the adaptive filter is not controlled to start adapting to the new echo path characteristics and is therefore not performing the echo cancellation function correctly.

If a detection scheme falsely detects an EPC condition when there is actually no EPC or DT, the adaptive filter is controlled to start adapting unnecessarily and thus wastes valuable real time.

If a detection scheme mistakenly detects a DT condition instead of an existing EPC condition, the NLP will be opened mistakenly, allowing an unacceptably large echo be transmitted to the far end; also, the adaptive filter is not controlled to start adapting to the new echo path characteristics and is therefore not performing its cancellation function correctly.

If a detection scheme mistakenly detects an EPC condition instead of an existing DT condition, the NLP gate will not be opened as needed, thereby preventing the transmission of a valid s(n) to the far end, i.e. the link effectively becomes half-duplex; also, the adaptive filter is controlled to adapt and may thus diverge as a result of a strong s(n) signal.

It may be realized from the above discussion that any miss, false detection or confused detection in the DT and EPC conditions may lead to severe performance deterioration of an echo cancellation system. It is therefore critically important to reliably detect and distinguish between DT and EPC conditions.

Figure 2:
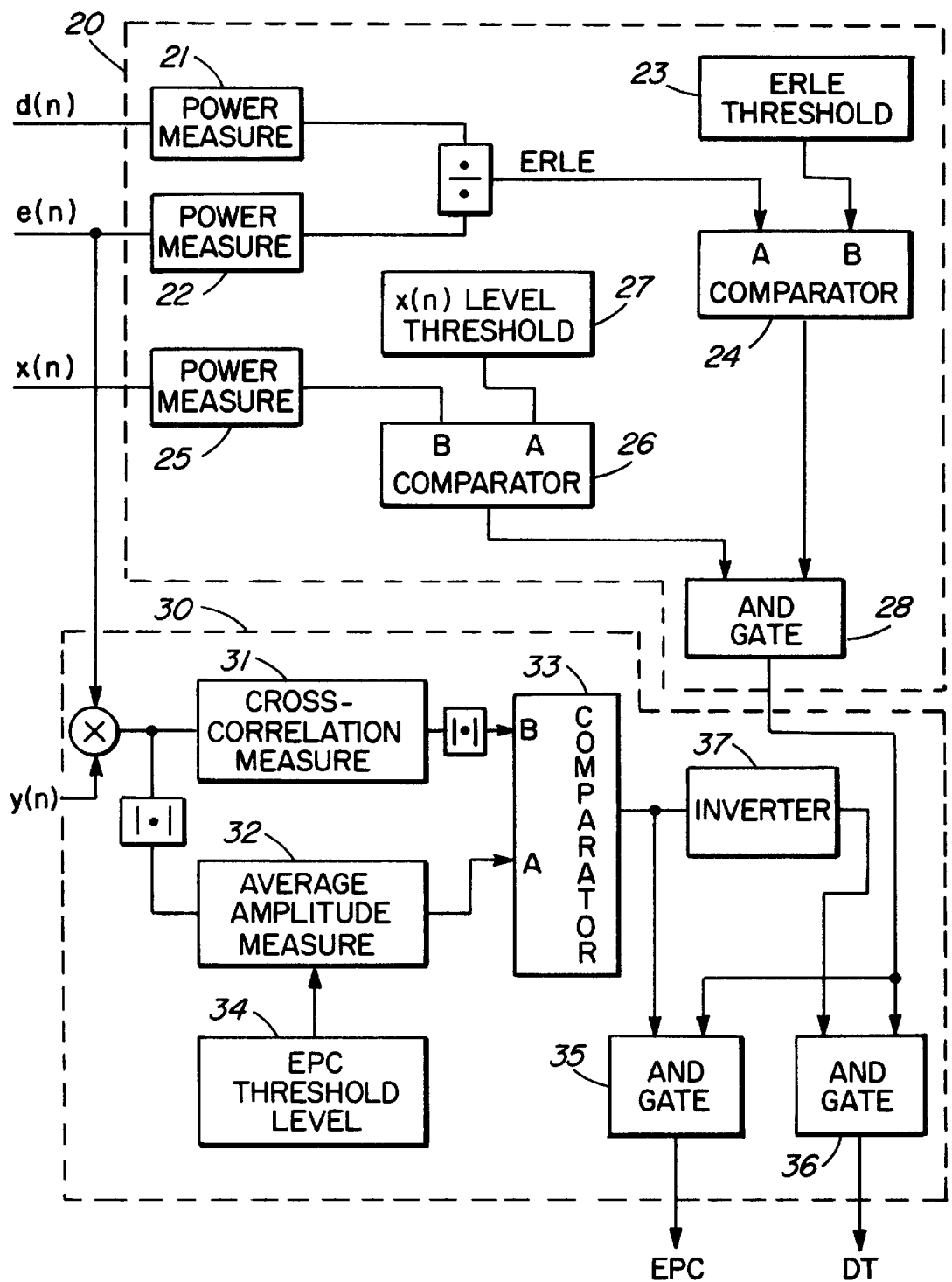
FIG. 2 is a block circuit diagram of an echo canceller in accordance with the invention.
Figure 3:
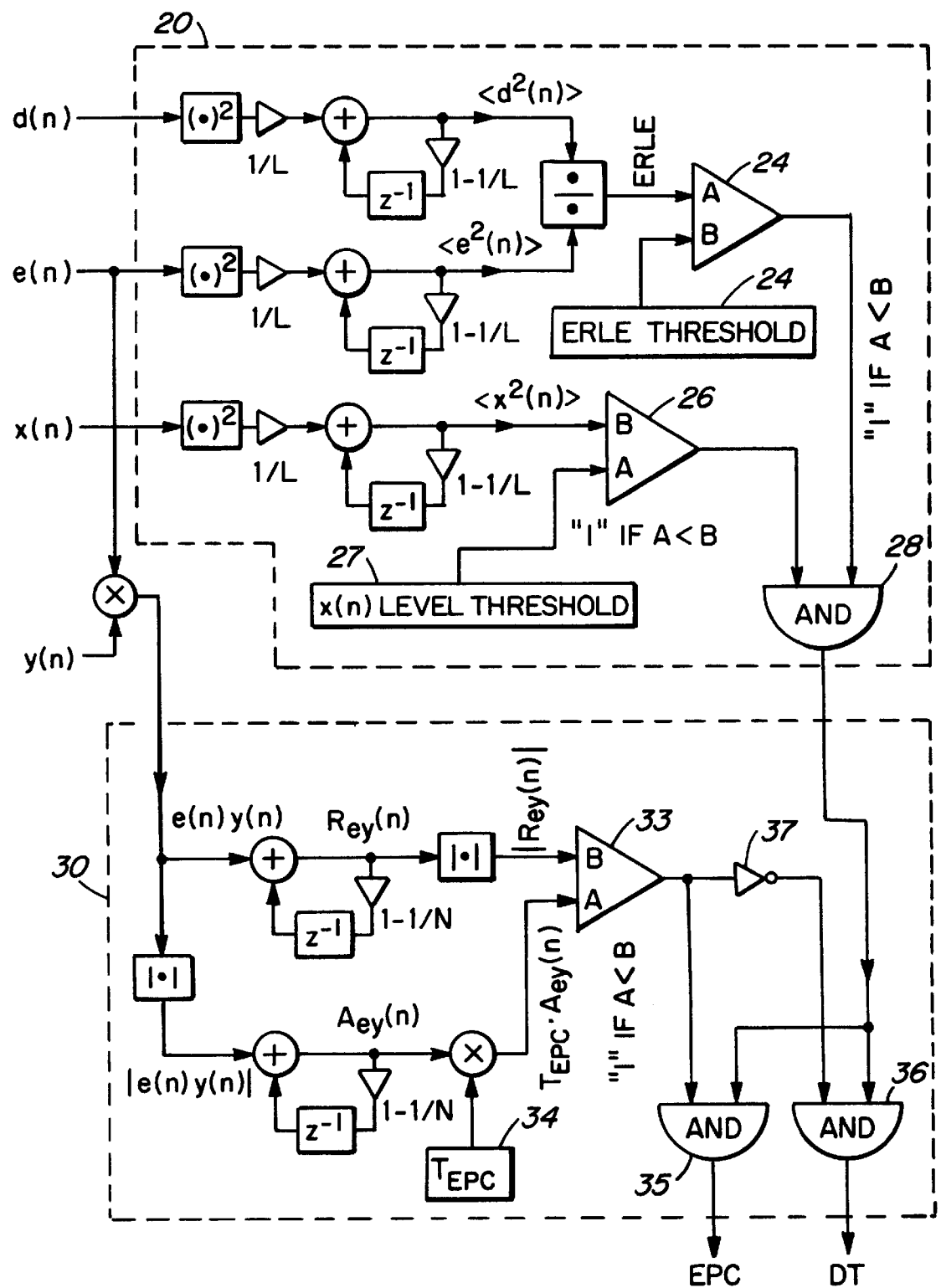
FIG. 3 is a schematic diagram of the circuit of FIG. 2.

FIGS. 2 and 3 are block schematic diagram representations of a circuit that is in effect created when a DSP embodying the adaptive echo canceller is suitably programmed in accordance with the invention.

The circuit of the invention is comprised of two parts each of which is basically independent of the other. The first part which may be labelled an energy comparison circuit provides an output which is employed by the second part which may be labelled an orthogonality monitor for providing a signal distinguishing between DT and EPC conditions.

An energy comparison circuit 20 continuously monitors the parameter known as the echo return loss enhancement (ERLE) generated by the echo canceller. ERLE is defined as:

$$ERLE = \frac{E[d^2(n)]}{E[e^2(n)]} \qquad \text{(Equation 1)}$$

where E[ ] is the statistical expectation operator. In practice, a statistical expectation can be approximated by a time average with an exponentially decaying window; "L" determines the equivalent time window length in estimating time averages $<d^2(n)>$, $<e^2(n)>$, and $<x^2(n)>$, and L can be the same as N as discussed below.

Measurement circuit 21 measures the power level of signal d(n) whereas measurement circuit 22 measures the power level of signal e(n). The result of the ERLE determination is compared to a predermined threshold level 23 in a comparator 24. If the ERLE threshold level is greater than the ERLE level, the comparator output is HIGH, otherwise, it is LOW. The ERLE threshold level is chosen such that ERLE fluctuations when there is no DT or EPC do not trigger the comparator 24 to output a "1", but will do so when a DT or EPC condition exits. The actual threshold level employed to realize the invention will of course vary in accordance with the actual implementation. As a starting point of system tuning, this threshold can be set as a longer (than L samples) term average of the ERLE less an offset of a few db such as, for example, 6 db. The offset value may then be fine tuned for maximum efficiency.

Measurement circuit 25 measures the power level of signal x(n) and provides an output signal that is fed to one input of a comparator 26 whose other input is connected to a source of x(n) signal threshold level 27. This threshold level is set to ensure that the signal x(n) being measured is above the noise level on the link. If the level of the measured x(n) signal is greater than the threshold level 27, the output signal of the comparator 26 is HIGH. The outputs of comparators 24 and 26 are connected to AND gate 28 which provides a HIGH output signal if the ERLE level drops significantly while there is a significant x(n) signal level. A HIGH signal at the output of gate 28 thus indicates that a candidate for EPC or DT condition exists and the signal is fed to the orthogonality monitor 30 for determining which one it is.

It should be realized that although a particular embodiment of an energy comparison circuit has been described, it may be possible to use one or more of the circuits described in the references identified above to provide a signal similar to that obtained at the output of gate 28. The present invention lies in the provision of a novel orthogonality monitor that uses the output of an energy comparison circuit to differenciate between EPC and DT conditions.

The orthogonality monitor 30 of the invention comprises a cross-correlation function 31 and an average amplitude estimating function 32. As mentioned above, a statistical expectation is approximated by a time averaging function. Using a common forgetting factor (1−1/N), the cross-correlation between signals e(n) and y(n) is determined iteratively using the following equation:

$$R_{ey}(n) = \left[1 - \frac{1}{N}\right] R_{ey}(n-1) + \frac{1}{N} e(n)y(n) \qquad \text{(Equation 2)}$$

whereas an amplitude estimate of e(n)y(n) is also determined iteratively using the following equation:

$$A_{ey}(n) = \left[1 - \frac{1}{N}\right] A_{ey}(n-1) + \frac{1}{N} |e(n)y(n)| \qquad \text{(Equation 3)}$$

The initial conditions of $R_{ey}(n)$ and $A_{ey}(n)$ are zero. In equations 2 and 3, N is the equivalent averaging window length. Since the product e(n)y(n) is usually very small in magnitude, the scaling factor 1/N in the second terms in both equations 2 and 3 may be omitted in order to simplify the calculation and make fuller use of the digital dynamic range with a fixed point processor. The equations 2 and 3 thus become:

$$R_{ey}(n) = \left[1 - \frac{1}{N}\right] R_{ey}(n-1) + e(n)y(n) \qquad \text{(Equation 4)}$$

and $$A_{ey}(n) = \left[1 - \frac{1}{N}\right] A_{ey}(n-1) + |e(n)y(n)| \qquad \text{(Equation 5)}$$

However, measures must be taken to prevent wrap-around of the digital words from occurring; this can usually be achieved by letting the DSP operate in the saturation mode. FIG. 3 of the drawings illustrate the circuit of the invention without the scaling factor 1/N. The absolute value of the output result $R_{ey}(n)$ of the cross-correlation function 31 is fed to a first input B of a comparator 33 whereas the output result $A_{ey}(n)$ of the average amplitude measure function is scaled with an echo path change threshold level signal $T_{EPC}$ from a circuit 34 and fed to a second input A of the comparator 33. The output signal of the comparator 33 is fed to a first AND gate 35 and to a second AND gate 36 via an inverter circuit 37. The output signal from gate 28 in the energy comparison circuit 20 is fed to the other respective inputs of gates 35 and 36.

Figure 4:
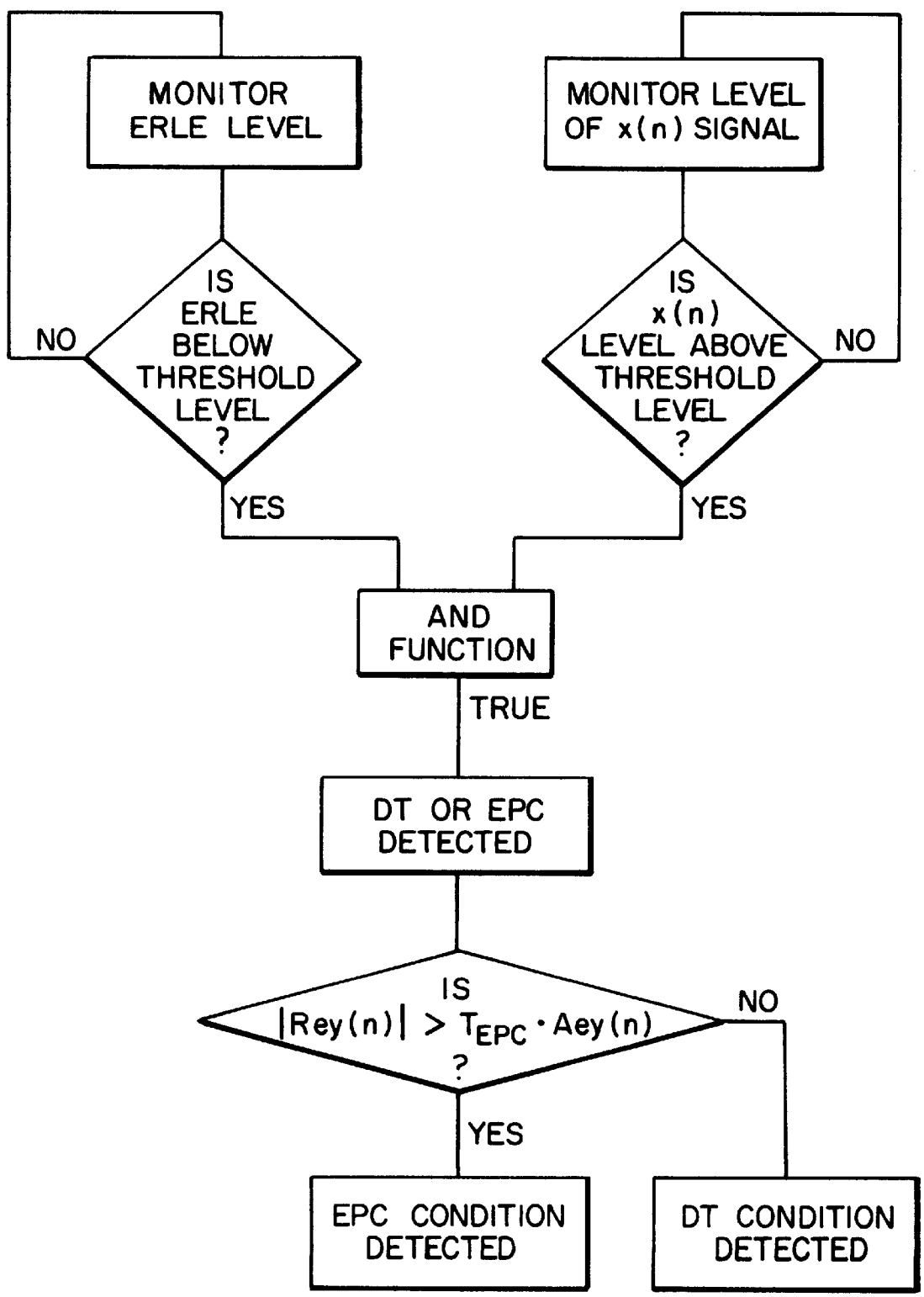
FIG. 4 is a flowchart diagram illustrating the operation of the circuit shown in FIGS. 2 and 3.

As illustrated in FIGS. 2, 3 and 4 the function of comparator 33 is to compare the absolute value of cross-correlation $R_{ey}(n)$ between signals e(n) and y(n) with an average amplitude estimate $A_{ey}(n)$ scaled with an echo path change threshold value $T_{EPC}$. This comparison may be expressed with the following equation:

$$|R_{ey}(n)| > T_{EPC} \cdot A_{ey}(n) \quad \text{(Equation 6)}$$

Parameters in the above equations of N=200 and $T_{EPC}$=0.25 have been found to provide satisfactory results under many conditions; these may of course vary depending on the particular implementation of the invention.

If the absolute value of cross-correlation $|R_{ey}(n)|$ is larger than the average amplitude estimate $A_{ey}(n)$ scaled by the threshold value $T_{EPC}$, the output of comparator 33 is HIGH and that signal ANDED with a HIGH signal from AND gate 28 indicates that an echo path change situation has been detected. A LOW signal at the output of comparator ANDED with a HIGH signal from gate 28 indicates that a double talk condition has been detected.

It is also evident from FIGS. 2 and 3 and from the flowchart of FIG. 4 that the orthogonality monitoring function, except those of 31 and 32, need only be activated if the output of AND gate 28 is HIGH and thus indicates that a candidate situation for EPC or DT condition has been detected.

The invention thus provides a novel DT and EPC detection scheme that supplements conventional energy comparison schemes with a simple yet effective orthogonality monitoring mechanism that greatly improves the ability to distinguish between EPC and DT conditions.

Although a particular embodiment of the invention has been illustrated and described, it is apparent that various changes to the described invention can be introduced without departing from the scope and spirit of the invention.

In order to exemplify the simplicity and adaptibility of the invention to contemporary systems and components available as off-the-shelf items, the following appended code is what is necessary to embody the method of the invention into a known DSP platform such as component TMS320C54X available from Texas Instruments, Inc.

The DSP runs the following code once every signal sample:

```
MPYA   @err           ; B <— e(n) *y(n)
ABS    B,A            ; A <— e(n) *y(n)
STM    #BETA,T        ; T <— BETA
MACR   @LP_EY,B       ; B <— LP_EY(n)=BETA*LP_EY(n-1)+
                         e(n)*y(n)
STH    B,@LP_AEY,A    ; Save LP_EY(n)
MACR   @LP_AEY,A      ; A <— LP_AEY(n)+BETA*LP_AEY(n-
                         1)+e(n)*y(n)
STH    A,@LP_AEY      ; Save LP_AEY(n)
```

The DSP runs the following code once when the energy comparison circuit determines that a candidate for EPC or DT condition exists:

```
LD     @LP_EY,16,B    ; BH <— LP_EY(n)
ABS    B              ; BH <— LP_EY(n)
STM    #THR,T         ; T <— THR
MAS    @LP_AEY,B      ; B <— LP_EY(n)-THR*LP_AEY(n)
; On exit: EPC if B > 0; DT otherwise
```

I claim:

1. A method of detecting double talk (DT) and echo path change (EPC) conditions in an echo canceller comprising an adaptive filter for being communicatively coupled between a receive path and a transmit path at a network node of a communication system and means for distinguishing between DT and EPC conditions, comprising the steps of:

generating an echo return loss enhancement (ERLE) signal from signals at the echo canceller using the relationship:

$$ERLE = \frac{E[d^2(n)]}{E[e^2(n)]}$$

wherein:

E[ ] is a statistical expectation operator;

d(n) is a perceived near-end signal which is the sum of a near-end generated signal s(n) and an echo signal u(n); and e(n) is an output signal to be transmitted from the echo canceller to the network link;

and comparing it to a first threshold level;

generating a signal corresponding to the energy level of a signal x(n) which is the incoming reference signal for the echo canceller and comparing it to a second threshold level;

generating a predetermined signal to an orthogonality monitor if the energy level of the ERLE signal is below the value of the first threshold level and the energy level of the x(n) signal is above the value of the second threshold level, the predetermined signal indicating that a DT or EPC condition has been detected;

the orthogonality monitor generating an EPC acknowlegement signal in response to the predetermined signal if the absolute value of cross-correlation between signals e(n) and y(n) is greater than the product of a predetermined EPC threshold level ($T_{EPC}$) and an average amplitude estimate of e(n)y(n), in accordance with the relationship:

$$|R_{ey}(n)| > T_{EPC} \cdot A_{ey}(n)$$

wherein:

y(n) is the echo estimate signal generated by the adaptive filter of the echo canceller; and the orthogonality monitor generating a DT acknowledgement signal if the absolute value of cross-correlation between signals e(n) and y(n) is equal or less than the product of $T_{EPC}$ and $A_{ey}(n)$.

2. A method as defined in claim 1 wherein the EPC threshold level has a constant value approximately equal to 0.25.

3. A method as defined in claim 1 wherein the cross-correlation between signals e(n) and y(n) follows the following relationship:

$$R_{ey}(n) = \left[1 - \frac{1}{N}\right] R_{ey}(n-1) + e(n)y(n)$$

and the average amplitude estimate of the product between signals e(n) and y(n) follows the following relationship:

$$A_{ey}(n) = \left[1 - \frac{1}{N}\right] A_{ey}(n-1) + |e(n)y(n)|$$

wherein:

N is the equivalent averaging window length.

4. A method as defined in claim 1 wherein the cross-correlation between signals e(n) and y(n) follows the following relationship:

$$R_{ey}(n) = \left[1 - \frac{1}{N}\right]R_{ey}(n-1) + \frac{1}{N}e(n)y(n)$$

and the average amplitude estimate of the product between signals e(n) and y(n) follows the following relationship:

$$A_{ey}(n) = \left[1 - \frac{1}{N}\right]A_{ey}(n-1) + \frac{1}{N}|e(n)y(n)|$$

wherein:

N is the equivalent averaging window length.

5. A method as defined in claim 3 or 4 wherein the value of N is approximately 200.

6. An echo canceller for detecting echo path change (EPC) and double talk (DT) conditions and for distinguishing therebetween, comprising, an adaptive filter for being communicatively coupled between a receive path and a transmit path at a network node of a communication system and for generating an echo estimate signal y(n) from a reference signal x(n) received at the echo canceller;

means for generating an echo return loss enhancement (ERLE) signal from signals at the echo canceller using the relationship:

$$ERLE = \frac{E[d^2(n)]}{E[e^2(n)]}$$

wherein:

E[ ] is a statistical expectation operator;

d(n) is a perceived near-end signal which is the sum of a near-end generated signal s(n) and an echo signal u(n); and e(n) is an output signal to be transmitted from the echo canceller to the network link;

and comparing it to a first threshold level;

means for generating a signal corresponding to the energy level of a signal x(n) which is the incoming reference signal for the echo canceller and comparing it to a second threshold level;

means for generating a predetermined signal to an orthogonality monitor if the energy level of the ERLE signal is below the first threshold level and the energy level of the x(n) signal is above the second threshold level, the predetermined signal indicating that a DT or EPC condition has been detected;

the orthogonality monitor comprising means for generating an EPC acknowledgement signal if the absolute value of cross-correlation between signals e(n) and y(n) is greater than the product of a predetermined EPC threshold level ($T_{EPC}$) and an average amplitude estimate of e(n)y(n), the determination meeting the relationship:

$$|R_{ey}(n)| > T_{EPC} \cdot A_{ey}(n)$$

wherein:

y(n) is the echo estimate signal generated by the adaptive filter of the echo canceller; and the orthogonality monitor comprising means for generating a DT acknowlegement signal if the absolute value of cross-correlation between signals e(n) and y(n) is not greater than the product of $T_{EPC}$ and $A_{ey}(n)$.

7. An echo canceller as defined in claim 6 wherein the EPC threshold level has a constant value approximately equal to 0.25.

8. An echo canceller as defined in claim 6 wherein the orthogonality monitor comprises, means for determining the cross-correlation between signals e(n) and y(n) in accordance with the relationship:

$$R_{ey}(n) = \left[1 - \frac{1}{N}\right]R_{ey}(n-1) + e(n)y(n)$$

and, means for determining the average amplitude of the product between signals e(n) and y(n) in accordance with the following relationship:

$$A_{ey}(n) = \left[1 - \frac{1}{N}\right]A_{ey}(n-1) + |e(n)y(n)|$$

wherein:

N is the equivalent averaging window length.

9. An echo canceller as defined in claim 6 wherein the orthogonality monitor comprises, means for determining the cross-correlation between signals e(n) and y(n) in accordance with the relationship:

$$R_{ey}(n) = \left[1 - \frac{1}{N}\right]R_{ey}(n-1) + \frac{1}{N}e(n)y(n)$$

and, means for determining the average amplitude of the product between signals e(n) and y(n) in accordance with the following relationship:

$$A_{ey}(n) = \left[1 - \frac{1}{N}\right]A_{ey}(n-1) + \frac{1}{N}|e(n)y(n)|$$

wherein:

N is the equivalent averaging window length.

10. An echo canceller as defined in claims 8 or 9 wherein the value of N is approximately 200.

11. An echo canceller as defined in claim 10 wherein the adaptive filter, the means for generating the ERLE signal, the means for generating the energy level of signal x(n), the means for generating the predetermined signal and the orthogonality monitor are all embodied in a suitably programmed digital signal processor.

* * * * *